United States Patent
Bell

(10) Patent No.: US 11,077,574 B2
(45) Date of Patent: Aug. 3, 2021

(54) END PREPARATION TOOL FOR PRE-INSULATED TUBING

(71) Applicant: Dekoron Unitherm LLC, Cape Coral, FL (US)

(72) Inventor: Richard Bell, Ft. Myers, FL (US)

(73) Assignee: Dekoron Unitherm LLC, Cape Coral, FL (US)

( * ) Notice: Subject to any disclaimer, the term of this patent is extended or adjusted under 35 U.S.C. 154(b) by 0 days.

(21) Appl. No.: 16/703,543

(22) Filed: Dec. 4, 2019

(65) Prior Publication Data

US 2020/0171692 A1    Jun. 4, 2020

Related U.S. Application Data

(60) Provisional application No. 62/775,148, filed on Dec. 4, 2018.

(51) Int. Cl.
*B26D 3/16* (2006.01)
*F16L 59/02* (2006.01)

(52) U.S. Cl.
CPC ............. *B26D 3/169* (2013.01); *B26D 3/166* (2013.01); *F16L 59/029* (2013.01)

(58) Field of Classification Search
CPC .......... B23D 3/16; B23D 3/166; B23D 3/169; B23D 21/06; B23D 21/08; H02G 1/12; H02G 1/1224; H02G 1/1202; H02G 1/1204; H02G 1/1207; H02G 1/1214; H02G 1/1239; H02G 1/1229; H02G 1/1246; H01G 1/1209

See application file for complete search history.

(56) References Cited

U.S. PATENT DOCUMENTS

| | | | | |
|---|---|---|---|---|
| 2,622,323 A | * | 12/1952 | Grimaldi | B23D 21/08 30/101 |
| 4,587,731 A | * | 5/1986 | Krampe | H02G 1/1224 30/90.1 |
| 5,067,241 A | * | 11/1991 | Goodman | B26B 27/00 30/289 |
| 7,059,166 B2 | * | 6/2006 | Bowles | B25B 27/10 29/237 |

FOREIGN PATENT DOCUMENTS

| | | | | |
|---|---|---|---|---|
| CN | 206123537 U | * | 4/2017 | |
| DE | 3808950 A1 | * | 10/1989 | ........... H02G 1/1229 |
| DE | 3904323 A | * | 8/1990 | |
| GB | 2457346 A | * | 8/2009 | ............. B26D 3/169 |
| GB | 2558990 | * | 7/2018 | |
| GB | 2583554 A | * | 11/2020 | ........... B23D 45/126 |

* cited by examiner

*Primary Examiner* — Jennifer S Matthews

(74) *Attorney, Agent, or Firm* — Levenfeld Pearlstein, LLC

(57) ABSTRACT

A tool is configured for preparing an end of a pre-insulated tubing bundle having a central tube having a diameter and an outer insulation covering have a diameter. The tool includes a body having first and second body sections joined to one another and movable between an open position and a closed position. The body sections, when joined to one another define a circular central opening. The circular central opening has a diameter about equal to the diameter of the outer insulation covering. A cutting blade is positioned in one of the first and second section sections extending inwardly of the circular central opening a distance equal to one-half of a difference between the diameter of the outer insulation covering and the diameter of the central tube.

8 Claims, 3 Drawing Sheets

END PREPARATION TOOL FOR PRE-INSULATED TUBING

CROSS-REFERENCE TO RELATED APPLICATION DATA

This application claims the benefit of and priority to Provisional U.S. Patent Application Ser. No. 62/775,148, filed Dec. 4, 2018, titled END PREPARATION TOOL FOR PRE-INSULATED TUBING, the disclosure of which is incorporated herein in its entirety.

BACKGROUND

The present disclosure relates to a tool for preparing the ends of pre-insulated tubing and more particularly, to a tool for removing the outer jacket and insulation from pre-insulated tubing.

Pre-insulated tubing bundles are composed of a single metal or polymer tube that is covered with thermal insulation and an outer weather-protective jacket. Such pre-insulated tubing is used extensively in industry to, for example, transport steam from a main steam line to various instruments or processes, and to return spent steam in the form of hot condensate back to the steam boiler. The thermal insulation provides employee protection from the hot steam and reduces the amount of heat lost to the atmosphere over the length of the tubing from the source, for example, a boiler to the process and back to the boiler. This provides an efficient heating system conserving energy and fuel.

Pre-insulated tubing bundles are supplied in long, continuous lengths and are cut into desired lengths as required during installation to reduce waste. In order to connect the tubing to a process or steam supply manifold, an installer must first remove the outer weather-protective jacket and thermal insulation.

Current methods involve the use of a utility knife or other tool with a sharp blade to cut through and remove the outer layers. The installer must cut completely around the circumference of the outer jacket and insulation, without cutting into the process tube in the center. This operation often takes place in congested areas with poor lighting and with tubing bundles that may be positioned at odd angles to the installer. At time, the installer may be required to cut with the blade facing her body.

Additionally, the installer may cut too deep, damaging the process tube. When this occurs, the installer must either cut back additional jacket and insulation to eliminate the damaged area or it may require a new section of pre-insulated tubing bundle.

One known device has a scissors-like shape with an open rounded cradle on a side of one leg of the scissor to receive or support the pre-insulated tubing bundle and blade on the opposite, facing side of the leg. The blade leg is closed onto the tubing bundle jacket and/or insulation and is rotated around the bundle to cut through the jacket and insulation.

Although such a tool is a vast improvement over using a utility or other open knife blade in that the blade is covered when not in use, the scissor handles may make use of the tool difficult in space-limited situations, and an installer may still damage the tubing if the cut is too deep.

Accordingly, there is a need for a pre-insulated tubing bundle end preparation tool that cuts into and through the outer jacket and insulation of the tubing bundle but does not cut into the tubing. Desirably, such a tool is relatively small and cab be used in limited space situations, such as tight areas, without undue manipulation of the tool. More desirably still, such a tool is fully self-contained and include a guard to, for example, enclose or cover a cutting blade.

SUMMARY

A tool is configured for preparing an end of a pre-insulated tubing bundle having a central tube having a diameter and an outer insulation covering have a diameter. The tool includes a body having first and second body sections joined to one another and movable between an open position and a closed position. In an embodiment, the first and second body sections are pivotally joined to one another at a hinge.

The body sections, when joined to one another define a circular central opening. The circular central opening has a diameter about equal to the diameter of the outer insulation covering.

A cutting blade is positioned in one of the first and second section sections and extends inwardly of the circular central opening a distance equal to one-half of a difference between the diameter of the outer insulation covering and the diameter of the central tube.

In an embodiment, the hinge is defined by aligned openings extending through the first and second body portions and a hinge pin positioned through the aligned openings. The hinge can be formed by a hinge projection in one of the body portions and a hinge recess in the other body portion. In such embodiments, the aligned openings are formed in the hinge projection and in walls that define the hinge recess.

The tool can include a lock to secure the tool in the closed position. The lock can include locking openings in the hinge projection and hinge recess that are aligned with one another when the tool is closed, and a pin insertable into the locking openings to secure the tool in the closed position.

The tool can further include a blade guard configured for positioning in the circular central opening and overlying the blade when the tool is in the closed position. One blade guard is formed as a plug.

These and other features and advantages of the present invention will be apparent from the following detailed description, in conjunction with the appended claims.

DETAILED DESCRIPTION

Figure 1:
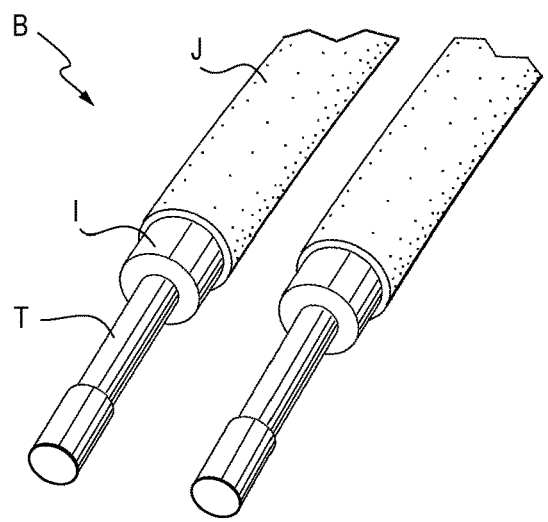
FIG. 1 is an illustration showing two pre-insulated tubing bundles.
Figure 4:
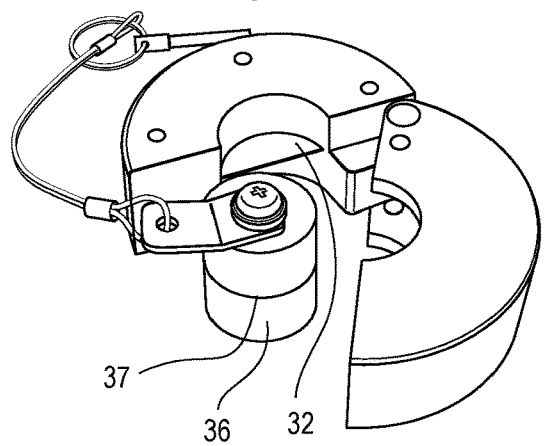
FIGS. 4 and 5 are illustrations of the tool open and with plug removed from the tool.
Figure 2:
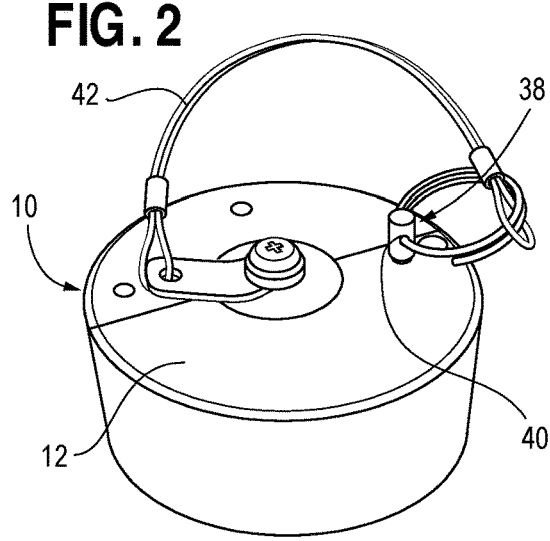
FIG. 2 is a illustration of an embodiment of a pre-insulated tubing bundle end preparation tool shown closed and locked, and with a tool plug in place.
Figure 5:
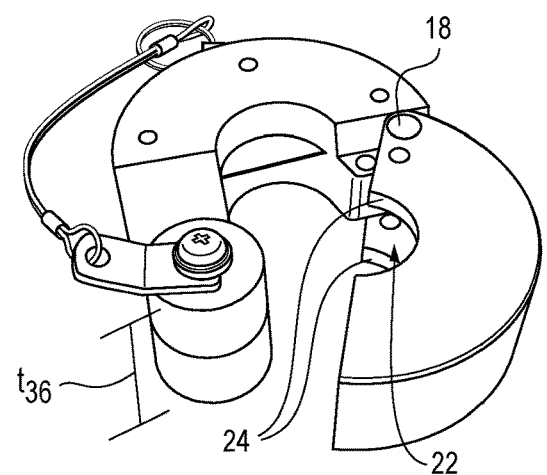
Figure 3:
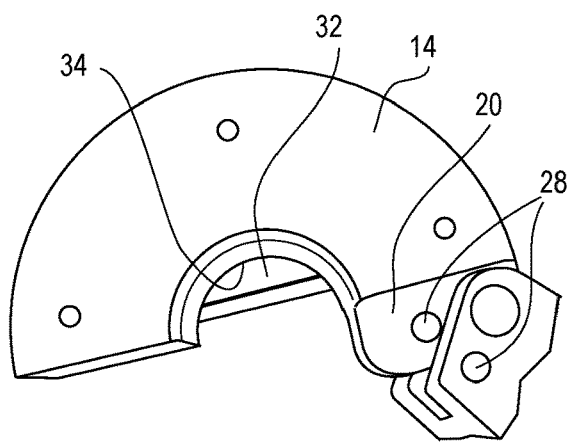
FIG. 3 is a top view of the tool in an open condition, showing the cutting blade.
Figure 6:
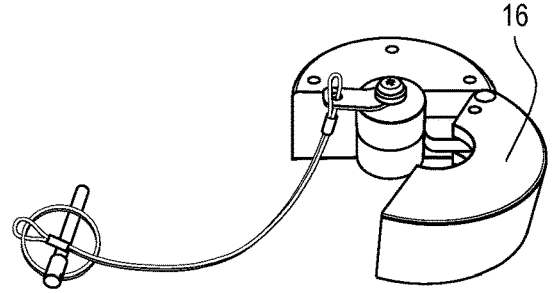
FIG. 6 is an illustration of the tool open with the plug in place in the tool.
Figure 7A:
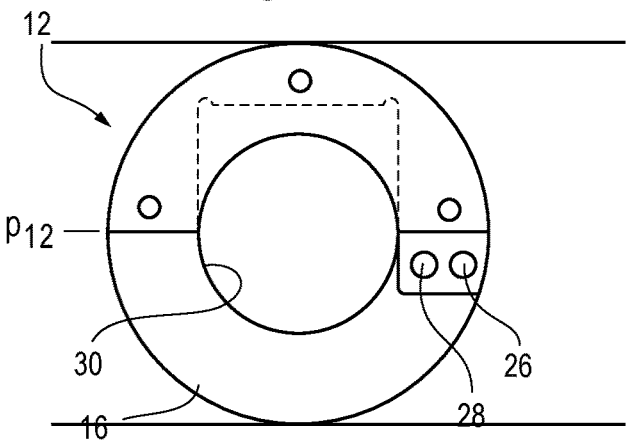
FIGS. 7A-7C are various views of the tool.
Figure 7B:
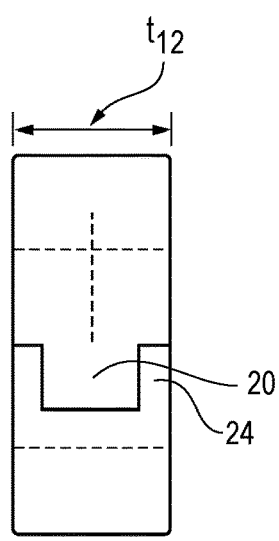
Figure 7C:
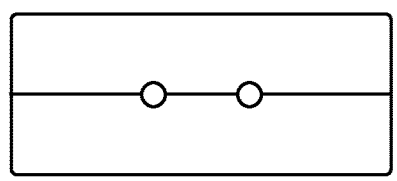

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates a typical pre-insulated tubing bundle B having a central tube T for conveying a material, such as steam or condensate, a layer of insulation I surrounding the tube T and an outer jacket J surrounding the layer of insulation I. Those skilled in the art will appreciate that such pre-insulated tubing bundles B are commonly and commercially available in a wide variety of sizes and in a wide variety of materials. For example, a tubing bundle may have a fluoropolymer tube, a foam or fiberglass insulation layer and a polyvinyl chloride (PVC) or thermoplastic polyurethane (TPU) outer jacket. Other materials will be recognized by those skilled in the art. For purposes of the present disclosure, the pre-insulated tubing bundle will be referred to as the "bundle" or the "tubing bundle". It will also be understood that the illustrated tubing bundle has its end prepared (or prepped) in that the outer jacket and insulation have been removed to expose a section of tubing to, for example, connect the tubing to an equipment item.

FIGS. 2-6 are various illustrations of an embodiment of the pre-insulated tubing end preparation tool 10 (the "tool"). The tool 10 includes a body 12 having first and second body sections 14, 16 mounted to one another. In an embodiment, the body sections 14, 16 are hingedly mounted to one another by, for example a hinge pin 18, to pivot the body sections 14, 16 between an open position (see FIG. 3) and a closed position (see FIG. 2). In the illustrated embodiment, one of the body sections 14 includes a knuckle or hinge projection 20 and the other body section 16 includes a hinge recess 22 defined by two hinge walls 24 in which the projection 20 is received. Openings 26 in the walls 24 and projection 20 align with one another to receive the hinge pin 18 about which the body sections 14, 16 pivot. In an embodiment the walls 24 and projection 20 include second openings 28 spaced from the hinge pin openings 26 that align with one another when the tool 10 is closed, as will be described below.

In an embodiment, the body 12 has a cylindrical shape having a depth $t_{12}$ (or thickness in a longitudinal direction l) and the body sections 14, 16 are about equal in size and defined by a longitudinal plane $p_{12}$ through body 12. That is, each body section 14, 16 comprises about one-half of the body 12.

The body 12 includes a circular central opening 30. The opening 30 is sized to accommodate a specific size of tubing bundle B. That is, a tool 10 may be sized to accommodate, for example, a 1½ inch outside diameter tubing bundle with a ½ inch tube, in which case the central opening has a diameter of 1½ inches.

A cutting blade 32 extends inwardly from an inner wall 34 of one of the sections, for example section 14, that defines the central opening 30. The blade 32 extends into the opening 30 to cut into the outer jacket J and the insulation I but not into the central tubing T. In an embodiment, the cutting blade 32 extends into the central opening 30 a distance equal to one-half of a difference between the diameter $d_J$ of the outer jacket and the diameter $d_T$ of the central tube T. For example, in the example noted above, in a tubing bundle B with a 1½ inch outside diameter (the diameter of the jacket $d_J$) and a ½ inch diameter tube $d_T$, the cutting blade 32 extends ½ inch inward of the central opening wall 34. As another example, in a tubing bundle B with a 2 inch outside diameter tubing bundle and a ½ inch diameter tube, the cutting blade 32 extends ¾ inch inward of the central opening wall 34.

As seen in FIGS. 2 and 4-6 the tool 10 can include a blade guard 36. In an embodiment, the blade guard 36 is formed as a plug and is sized to fit into the tool central opening 30. The blade guard 36 can have a slit or cut 37 to accommodate the cutting blade 32 when positioned in the opening 30. The blade guard 36 can have a thickness $t_{36}$ (longitudinal depth) about the same as the thickness $t_{12}$ of the body 12 so that when the guard 36 is positioned in the body 12 and the body 12 is closed, the tool 10 has a puck-like appearance.

The tool 10 can include a lock 38 to lock the tool 10 in the closed position. In an embodiment, the lock 38 is a pin 40 that cooperates with second openings 28 in the wall 24 and projection 20 to maintain or lock the tool 10 closed. And, with the blade guard 36 in place and the tool 10 locked, the blade is protected from inadvertent contact by a user. As seen in FIGS. 2 and 4-6, a cable 42 can be used to secure the pin 40 to the guard 36 to prevent misplacing the pin 40.

In a present embodiment, the body 12 is sufficiently thick ($t_{12}$) that it is stable when positioned on the tubing bundle B so that, as discussed below, the tool 10 can be rotated (see arrow at 44) around the tubing bundle B with the blade 32 positioned perpendicular to a longitudinal axis AB of the bundle B (that is, so that the tool 10 doesn't wobble back and forth, e.g., it remains perpendicular to the tubing bundle B) when the tool 10 is in use.

Figure 8A:
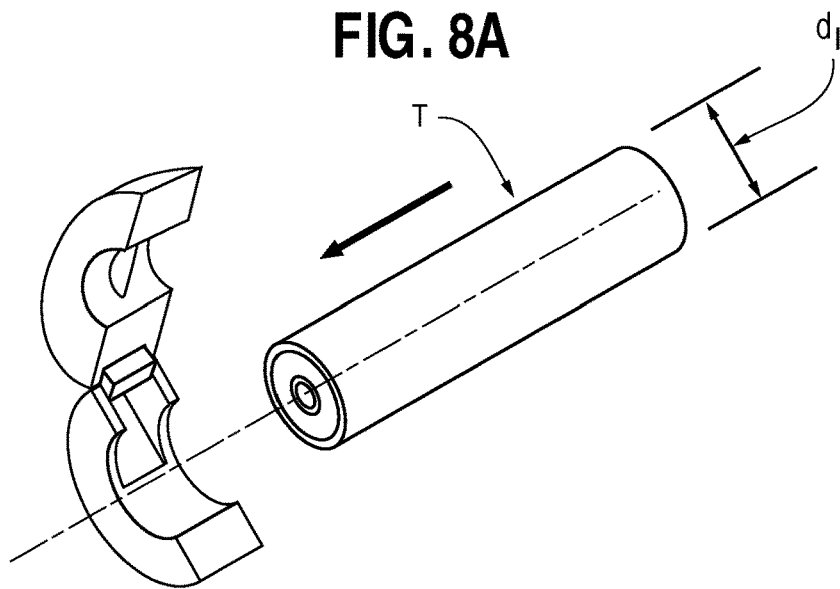
FIGS. 8A-8C are illustrations showing use of the tool.
Figure 8B:
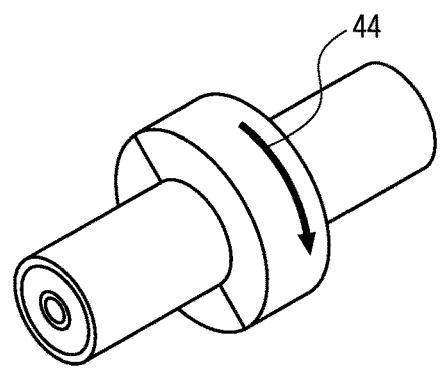
Figure 8C:
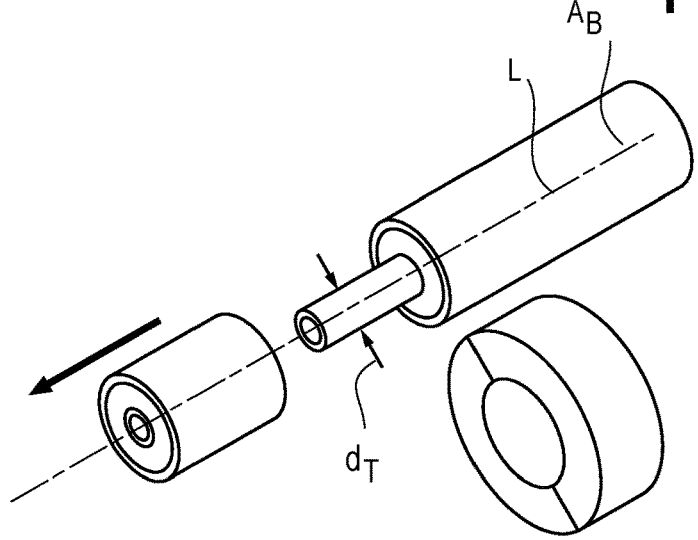

In use, the pin 40 is removed from the tool 10, the tool 10 is opened and the blade guard 36 is removed. Referring to FIGS. 8A-8C, the tool 10 is aligned with the tubing bundle B and closed on the bundle B. The tool 10 is rotated (as at 44) around the tubing bundle B so that the cutting blade 32 cuts through the outer jacket J and insulation I fully circumferentially around the bundle B. When the cut is complete, the tool 10 is opened and removed from the tubing bundle B, and the outer jacket J and insulation I are removed from the tube T.

In a present tool 10, the body 12 is formed from a polymeric material. Other suitable materials will be recognized by those skilled in the art.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A tool for preparing an end of a pre-insulated tubing bundle, the pre-insulated tubing bundle having a central tube having a diameter and an outer insulation covering have a diameter, the tool comprising:
    a body having first and second body sections joined to one another and movable between an open position and a closed position, the body sections, when joined to one another define a circular central opening, the circular central opening having a diameter about equal to the diameter of the outer insulation covering;
    a cutting blade positioned in one of the first and second section sections extending inwardly of the circular central opening a distance equal to one-half of a difference between the diameter of the outer insulation covering and the diameter of the central tube; and a blade cylindrical guard having a slit extending about a curvature of the guard to receive the blade is configured for positioning in the circular central opening and is enclosed by the tool in the closed position.

2. The tool of claim 1, wherein the first and second body sections are pivotally joined to one another at a hinge.

3. The tool of claim 2, wherein the hinge is defined by aligned openings extending through the first and second body portions and a hinge pin positioned through the aligned openings.

4. The tool of claim 3, wherein one of the body portions includes a hinge projection and the other body portion includes a hinge recess, and wherein the aligned opening are formed in the hinge projection and in walls that define the hinge recess.

5. The tool of claim 4, further including a lock to secure the tool in the closed position.

6. The tool of claim 5, wherein the lock includes locking openings in the hinge projection and hinge recess that are aligned with one another when the tool is closed, and further including a pin insertable into the locking openings to secure the tool in the closed position.

7. The tool of claim 1, further including a lock to secure the tool in the closed position.

8. The tool of claim 1, wherein the blade guard is formed as a plug.

\* \* \* \* \*